United States Patent [19]

Tavano

[11] 3,802,690
[45] Apr. 9, 1974

[54] PLATE GLASS SAFETY BAR

[76] Inventor: John B. Tavano, 28 Edgewood Dr., Torrington, Conn. 06790

[22] Filed: Apr. 21, 1972

[21] Appl. No.: 246,397

[52] U.S. Cl............. 269/166, 52/173, 52/202, 211/41, 269/321 F, 269/321 S
[51] Int. Cl............................................. B25b 5/02
[58] Field of Search........ 269/321 R, 321 F, 321 W, 269/321 H, 321 S, 317, 149, 166, 55; 211/41; 52/127, 173, 202, 7 KG

[56] References Cited
UNITED STATES PATENTS

| | | | |
|---|---|---|---|
| 2,599,010 | 6/1952 | Pernitz | 269/55 |
| 420,216 | 1/1890 | Tanner | 269/149 X |
| 3,412,867 | 11/1968 | Barkow | 211/41 |
| 2,887,231 | 5/1959 | Schodorf | 211/41 |
| 3,490,760 | 1/1970 | Nill | 269/321 R |
| 3,620,524 | 11/1971 | Czompi | 269/321 W X |
| 3,643,935 | 2/1972 | Bell | 269/321 S X |

Primary Examiner—Roy Lake
Assistant Examiner—Howard N. Goldberg

[57] ABSTRACT

A safety bar is presented which serves to support plate glass in a door during either installation or removal of the glass. The safety bar has a hook on one end, a slide clamp on the other end, and one or more rubber bearing block intermediate of the ends of the bar. The hook is adapted to be inserted into a screw hole on the molding of a plate glass door, and the slide clamp is adjusted to engage the outer leaf of the door. The one or more rubber blocks bear against the glass and hold the glass in position so that the plate glass can be removed or installed by one man.

4 Claims, 7 Drawing Figures

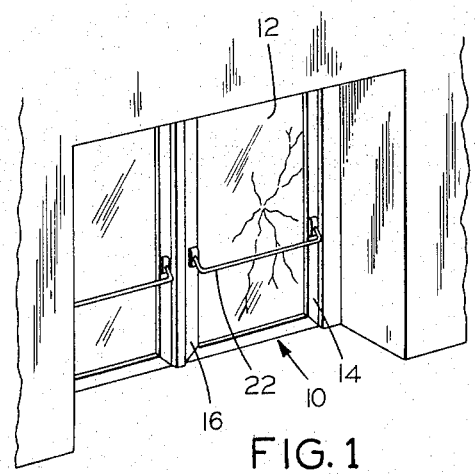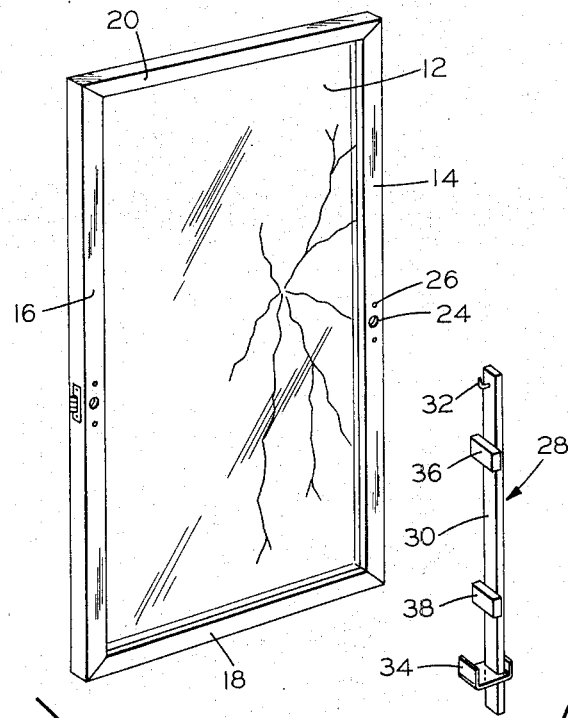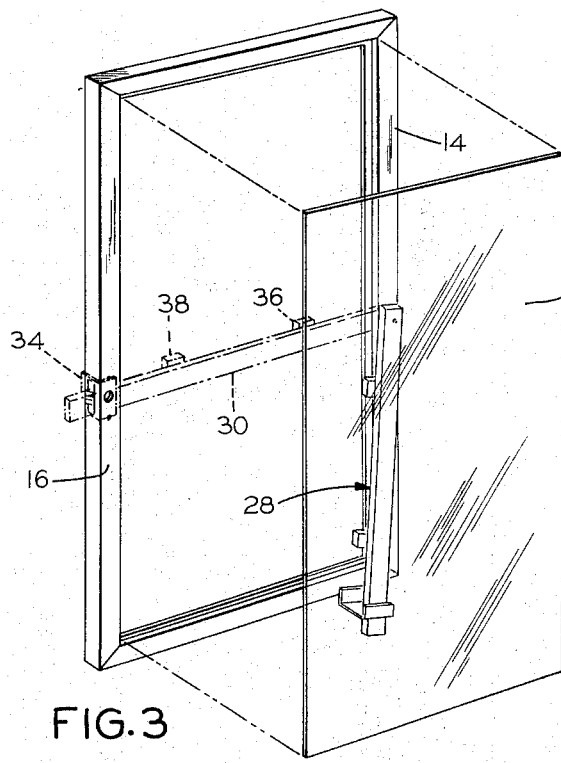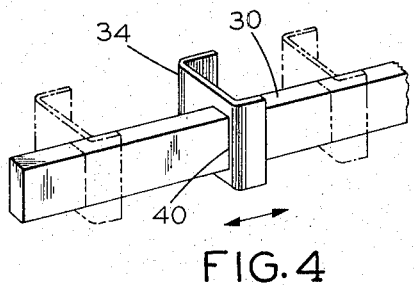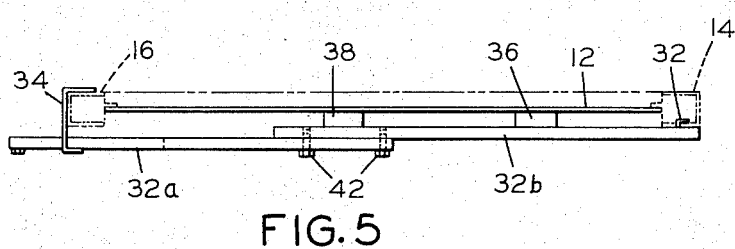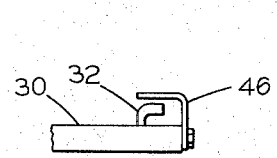

PLATE GLASS SAFETY BAR

BACKGROUND OF THE INVENTION

1. Field of the Invention

This invention relates to the field of safety bars. More particularly, this invention relates to safety bars adapted for use in installation and removal of sheets of plate glass in or from plate glass doors.

2. Description of the Prior Art

Heretofore in the plate glass industry the services of two men have been required to install a large sheet of plate glass in a plate glass door. Similarly, the services of two men have also been required to perform the task of removing the sheet of plate glass from a door when the glass must be replaced for reasons such as being cracked, being defective, etc. The services of these two men have always been required because one was needed to perform the function of holding the glass in place while the other works on the molding to set or remove blocks, molding, retainers and similar structure which must either be removed or set for removal or installation of the glass.

SUMMARY OF THE INVENTION

The present invention presents a safety bar for holding the plate glass of a plate glass door in place during installation or removal of the sheet of plate glass, thus eliminating the need for the use of two men during installation or removal. The safety bar of the present invention has an elongated main bar which is, preferably, of telescoping configuration. A hook at one end of the bar is adapted to fit into a screw hole in the inner leaf or hinge side molding of a plate glass door. An adjustable slide is mounted on the other end of the bar, this slide being adaptable for engagement with the outer leaf or molding of the plate glass door whereby the bar is then held in place on the door molding. One or more rubber blocks, preferably of suction cup configuration, are positioned intermediate of the ends of the bar, and these rubber cups bear against the plate glass whereby the sheet of plate glass is held in place. Since the plate glass is thus held in place by the safety bar, only one man is required to perform the necessary work in setting or removing blocks, retainers, or any other structure which is necessary to be set or removed in order to either install or remove the sheet of plate glass from the door.

Accordingly, one object of the present invention is to provide a novel and improved safety bar for use in setting and removing sheets of plate glass from a plate glass door.

Another object of the present invention is to provide a novel and improved safety bar for setting and removing sheets of plate glass from the plate glass door whereby only the services of one man are required for the setting and removal operations.

Other objects and advantages will be apparent and understood to those skilled in the art from the following detailed description and drawings.

BRIEF DESCRIPTION OF THE DRAWINGS

Referring now to the drawings, wherein like elements are numbered alike in the several figures, FIG. 1 is a perspective of a plate glass door with a broken pane of glass.

FIG. 2 is an enlarged showing of the broken door of FIG. 1 with the safety bar of the present invention.

FIG. 3 is a view depicting the insertion of a replacement sheet of glass in the broken door.

FIG. 4 is a view of a detail of the safety bar of the present invention.

FIG. 5 is a plan view of the preferred configuration of the safety bar of the present invention.

FIG. 6 is a view of a detail of the safety bar of the present invention.

FIG. 7 is a detail view of one end of the safety bar.

DESCRIPTION OF THE PREFERRED EMBODIMENTS

Referring now to FIG. 1, a double plate glass door installation is shown. One of the doors, indicated generally at 10, has a broken glass pane 12. The door has a frame or molding including a hinge leaf 14, and outer leaf 16, and lower and upper elements 18 and 20, respectively (see FIG. 2). A handle 22 is mounted on the hinge and outer leafs 14 and 16 and extends across the width of the door. Referring now to FIG. 2, an enlarged view of door 10 is shown with handle 22 and its mounting structure having been removed. Removal of the handle and its mounting structure exposes one or more operating holes 24 and one or more screw holes 26 in hinge leaf 14, as well as in outer leaf 16.

Still referring to FIG. 2, the safety bar 28 of the present invention is shown. Bar 28 has an elongated bar element 30, preferably of rectangular configuration. A hook 32 is positioned adjacent one end of bar element 30, hook 32 being adapted to engage one of the holes 24 or 26 in hinge leaf 14. An adjustable slide 34 is slideably mounted on the other end of bar element 30, slide 34 being a U-shaped channel element adapted to engage outer leaf 16. A pair of rubber blocks 36 and 38 are mounted on rod 30 on the same side thereof as hook 32 and the main channel of slide 34, these rubber blocks 36 and 38 being adapted to bear against and engage plate glass pane 12 when the safety bar is mounted on door 10. Blocks 36 and 38 may be mounted on rod 30, in any manner, such as by bonding or by screw fasteners passing through mounting holes as shown in FIG. 6.

Referring now to FIG. 4, a detail is shown of slide 34 mounted on the bar 30. As can be seen, slide 34 is a U-shaped channel element having a rectangular opening 40 at one end of the connecting web between the legs of the channel. Opening 40 is sized so that slide 34 mounts on and is slideable along bar 30 so that its positions on bar 30 can be adjusted, as shown in the dotted positions in FIG. 4 to accomodate doors of varying width. Referring now to FIGS. 3 and 5, safety bar 28 will be described as mounted on the door, the bar being shown in its mounted position in the dotted line in FIG. 3 and the showing of FIG. 5 being a plan view of the bar mounted on the door. To mount the bar on the door, hook 32 is inserted into screw opening 26 so that it extends into the interior of hinge leaf 14. During this insertion of hook 32, bar 30 may be in any general angular position, with respect to the door. After insertion of hook 16, bar 30 is positioned so that it extends across the door substantially perpendicular to each of the hinge and outer leafs 14 and 16 as shown in FIG. 3, and, as can be seen, the end of the bar on which slide 34 is mounted extends beyond outer leaf 16. Slide 34 is moved to a position on bar 30 beyond outer leaf 16, and it is then returned toward outer leaf 16 whereby the U-Channel engages outer leaf 16 to secure the bar to the door, the bar being held in position by reaction forces between slide 34 and bar 28 resulting from the sizing of opening 40 and the sizing of slide 34 and frame member 16. Rubber blocks 36 and 38 are thus brought into contact and bearing engagement with plate glass pane 12. Bar 28 is thus firmly mounted on the door, and the bearing engagement between blocks 36 and 38 and glass pane 12 serves to retain the glass pane in the door molding structure. With the glass pane thus firmly retained in place, one man can then proceed to work on the door to remove blocks, retainers or similar molding elements so that the glass pane can eventually be removed.

After the retaining elements have been removed, slide 34 is then moved outwardly to disengage from outer leaf 16, and bar 28 is then pivoted to the position shown in solid lines in FIG. 3, hook 32 still being retained in the screw opening in hinge leaf 14. With bar 28 thus moved clear of the glass pane, the broken pane can be removed and a new pane, indicated at 12a in FIG. 3, can then be inserted into the door. After the insertion of this new pane, bar 28 is again mounted to the dotted position as shown in FIG. 3, as previously described, so that the new pane is retained in place while one man works to replace the blocks, retainers and similar molding elements to complete the installation of the new glass pane.

As shown in FIG. 5 the preferred configuration for bar 30 is a two piece configuration wherein one part 32a is adjustable or telescopable with respect to the other element 32b. These telescoping parts are held together by a pair of retaining screws 42 which pass through an elongated slot opening in part 32a and are threaded into part 32b.

Referring now to FIG. 6, an alternative configuration is shown for the construction of the rubber blocks. The rubber blocks have previously been described as being solid pieces in the nature of pads or the like. As shown in FIG. 6, these blocks have central recesses 44 whereby the blocks may act as and serve as suction cups.

Referring now to FIG. 7, a cover plate 46 is shown pivotably mounted to the end of elongated bar element 30. Cover plate 46 when positioned as shown in FIG. 7 serves to protect hook 32 against accidental damage by impact or otherwise. When it is desired to expose hook 32 for mounting of the safety bar, plate 46 is merely pivoted 90° into or out of the plane of the paper so that it is pivoted out of the way and hook 32 exposed.

As can be seen from the foregoing description, a novel and improved safety bar has been presented and described which, when properly used, makes it possible for plate glass door panes to be installed or removed by one man.

While a preferred embodiment has been shown and described, various modifications and substitutions may be made thereto without departing from the spirit and scope of the present invention. Accordingly, it is to be understood that the present invention has been described by way of illustration and not limitation.

What is claimed is:

1. A safety bar for use in changing a sheet of material normally supported in a frame, said bar comprising:
   elongated bar element means, said bar element means consisting of at least two pieces longitudinally adjustable with respect to each other;
   hook means positioned adjacent one end of said bar element means for engaging said bar means with a pre-existing opening in a face surface of a frame;
   adjustable U-shaped slide element means mounted for movement along said bar element means for adjustably engaging said bar means with an edge surface of the frame to position said bar means in a fixed relationship with the frame, said slide means being spaced from said hook means, said hook means and slide means extending from the same side of said bar means; and
   bearing means mounted on said bar element means at a point within the frame for bearing against a sheet of material in the frame.

2. A safety bar as in claim 1 wherein:
   said bearing means includes a pair of spaced apart resilient elements.

3. A safety bar as in claim 1 wherein:
   said bearing means includes suction cup means.

4. A safety bar as in claim 1 further including:
   cover means for protecting said hook means.

* * * * *